(12) United States Patent
Artz et al.

(10) Patent No.: US 10,907,704 B2
(45) Date of Patent: Feb. 2, 2021

(54) TRANSMISSION BELT TENSIONER AND ASSOCIATED BELT DRIVE

(71) Applicant: Arntz Beteiligungs GmbH & Co. KG, Hoexter (DE)

(72) Inventors: Sander Artz, Gennep (NL); Mark Daemen, Gennep (NL); Andreas Klaffner, Aachen (DE)

(73) Assignee: ARNTZ BETEILIGUNGS GMBH & CO. KG, Hoexter (DE)

( * ) Notice: Subject to any disclaimer, the term of this patent is extended or adjusted under 35 U.S.C. 154(b) by 245 days.

(21) Appl. No.: 16/110,219

(22) Filed: Aug. 23, 2018

(65) Prior Publication Data

US 2019/0063564 A1 Feb. 28, 2019

(30) Foreign Application Priority Data

Aug. 25, 2017 (DE) .......................... 10 2017 119 552

(51) Int. Cl.
*F16H 7/12* (2006.01)
*F16H 7/02* (2006.01)
*F16H 7/08* (2006.01)

(52) U.S. Cl.
CPC ............. *F16H 7/1281* (2013.01); *F16H 7/02* (2013.01); *F16H 7/12* (2013.01); *F16H 2007/0802* (2013.01); *F16H 2007/0806* (2013.01); *F16H 2007/0808* (2013.01); *F16H 2007/0842* (2013.01); *F16H 2007/0865* (2013.01); *F16H 2007/0893* (2013.01); *F16H 2007/0897* (2013.01)

(58) Field of Classification Search
CPC ..... F16H 7/02; F16H 7/08; F16H 7/12; F16H 2007/0865; F16H 2007/0806; F16H 2007/0808; F16H 2007/0802; F16H 7/1281; F16H 2007/0893
See application file for complete search history.

(56) References Cited

U.S. PATENT DOCUMENTS 4,270,906 A * 6/1981 Kraft ........................ F02B 67/06
198/813
4,969,858 A * 11/1990 Hertrich ................ F16H 7/0848
474/117
5,234,385 A * 8/1993 Kawashima .......... F16H 7/1218
474/135

(Continued)

FOREIGN PATENT DOCUMENTS

DE 25 35 676 A1 2/1977
DE 31 04 201 A1 8/1982

(Continued)

*Primary Examiner* — Michael R Mansen
*Assistant Examiner* — Raveen J Dias
(74) *Attorney, Agent, or Firm* — W&C IP

(57) ABSTRACT

Transmission belt tensioner includes (a) a housing, (b) a set of disc springs, (c) a tensioning arm which is connected to the disc springs for compressing the disc springs upon a movement of the tensioning arm out of a neutral position in a deflection direction (A) relative to the housing. In an embodiment, a second set of disc springs is provided, wherein the tensioning arm is connected to the disc springs of the second set for compressing them upon a movement of the tensioning arm out of a neutral position in an opposite direction (G) to the deflection direction (A).

8 Claims, 4 Drawing Sheets

(56) References Cited

U.S. PATENT DOCUMENTS 5,277,666 A * 1/1994 Kumm ................. F16H 7/1236
                                                    474/133
2015/0011345 A1* 1/2015 Lescorail ............. F16H 7/1281
                                                    474/136

FOREIGN PATENT DOCUMENTS

DE          38 36 933 A1    5/1990
DE     10 2008 046425 A1    3/2010

* cited by examiner

TRANSMISSION BELT TENSIONER AND ASSOCIATED BELT DRIVE

FIELD OF THE INVENTION

The invention relates to a transmission belt tensioner with a housing, a set of disc springs and a tensioning arm which is connected to the disc springs for compressing the disc springs upon a movement of the tensioning arm out of a neutral position in a deflection direction relative to the housing.

BACKGROUND

This type of transmission belt tensioner is described in DE 3 104 201 and serves to apply a defined tensile force to a transmission belt of a rotating drive.

This type of transmission belt tensioner is a standard component and used in a range of belt drives. It is therefore preferable to design a transmission belt tensioner such that it can be used for as wide a variety of belt drives as possible.

SUMMARY

The invention aims to reduce disadvantages of the prior art.

The invention solves the problem by way of a transmission belt tensioner according to the preamble that comprises a second set of disc springs, wherein the tensioning arm is connected to the disc springs of the second set for compressing them upon a movement of the tensioning arm out of a neutral position in an opposite direction to the deflection direction relative to the housing.

The advantage of this transmission belt tensioner is that, in the event of a deflection, a restoring force is generated in both the deflection direction and the opposite direction. The transmission belt tensioner could thus be used in belt drives in which a tensile force is required in the event of deflection in the deflection direction as well as in belt drives in which a restoring force is needed upon deflection in the opposite direction. In comparison to known transmission belt tensioners, this can reduce the product variety of transmission belt tensioners.

A further advantage is that the transmission belt tensioner according to the invention has a simple structure and is therefore easy to produce.

A further advantage is that the transmission belt tensioner can be built in such a way that it is low-wear.

With transmission belt tensioners according to the invention, the first set of disc springs and the second set of disc springs work antagonistically to one another. As disc springs can be designed according to a preferred embodiment such that they feature a distinct range in accordance with Hooke's law, this range extending in particular beyond a deflection angle of 0° to at least 25°, a restoring force occurs upon deflection from the neutral position, this restoring force increasing proportionally to an increasing deflection. This kind of feature is especially well-suited for the tensioning of transmission belts. In contrast to this, the stiffness of the springs in transmission belt tensioners with rubber elements often increases upon increasing deflection.

The transmission belt tensioner preferably comprises a tension pulley that is fixed to the tensioning arm and is configured to interact with a transmission belt.

It is beneficial if the transmission belt tensioner comprises a transposition element that is connected to the tensioning arm in a torque-proof way and that has a thread, wherein the housing comprises a projection which engages with the thread and wherein the projection and the transposition element are designed to effect the compression of disc springs upon a movement of the tensioning arm out of the neutral position. In particular, the transposition element is configured to compress the set of springs when the tensioning arm is moved out of the neutral position in the deflection direction and to compress the second set of disc springs when the tensioning arm is moved out of the neutral position in the opposite direction. In other words, the transposition element is designed to transpose a rotational movement into a linear movement, wherein the disc springs are compressed by a linear movement.

It is favourable if the thread has a constant pitch. This type of thread is especially easy to produce.

Alternatively, the thread has a pitch which at least partially changes upon a deflection of the tensioning arm from the neutral position. In particular, it is possible that the pitch reduces upon the deflection of the tensioning arm from the neutral position such that the spring constant of the disc springs, which increases when the compression increases, is at least partially counterbalanced.

The tension pulley is preferably attached to the tensioning arm by means of a hole at a first distance from a rotational axis of the tensioning arm, wherein the tensioning arm has a second hole for attaching the tension pulley at a second distance which differs from the first distance. This provides a second way to change the tensile force, namely by fixing the tension pulley at a different distance to the rotational axis.

DESCRIPTION OF THE DRAWINGS

In the following, the invention will be explained in more detail by way of the attached drawings. They show FIG. 1 a schematic view of a belt drive according to the invention, FIG. 2 a transmission belt tensioner according to the invention for a belt drive according to FIG. 1, FIG. 3 a cross-section through the belt drive tensioner according to FIG. 2 and FIG. 4 an exploded view of the transmission belt tensioner according to FIG. 2.

DETAILED DESCRIPTION

Figure 1:
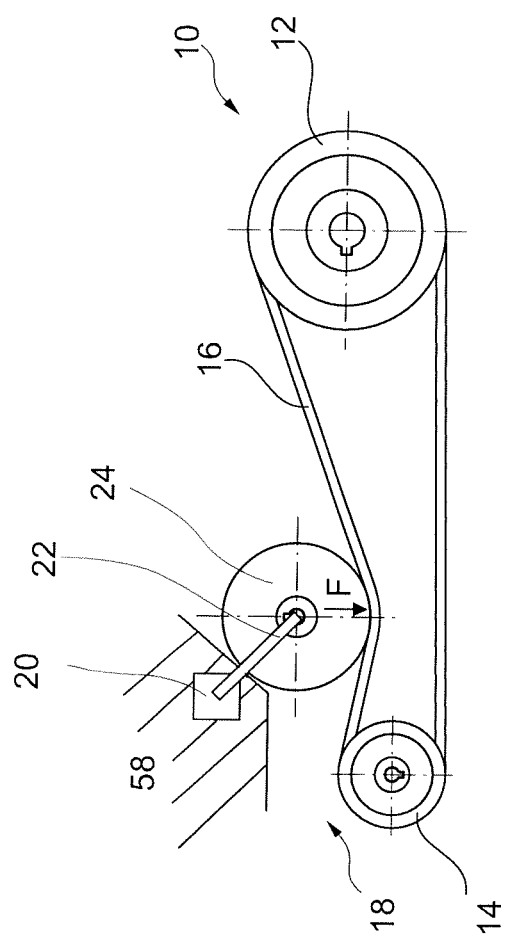

FIG. 1 shows a belt drive 10 according to the invention which comprises an input drive belt wheel 12, an output drive belt wheel 14, a transmission belt 16 and a transmission belt tensioner 18.

The transmission belt tensioner 18 comprises a housing 20, a tensioning arm 22 and a tension pulley 24 along which the transmission belt runs and by means of which it is tensioned.

Figure 2:
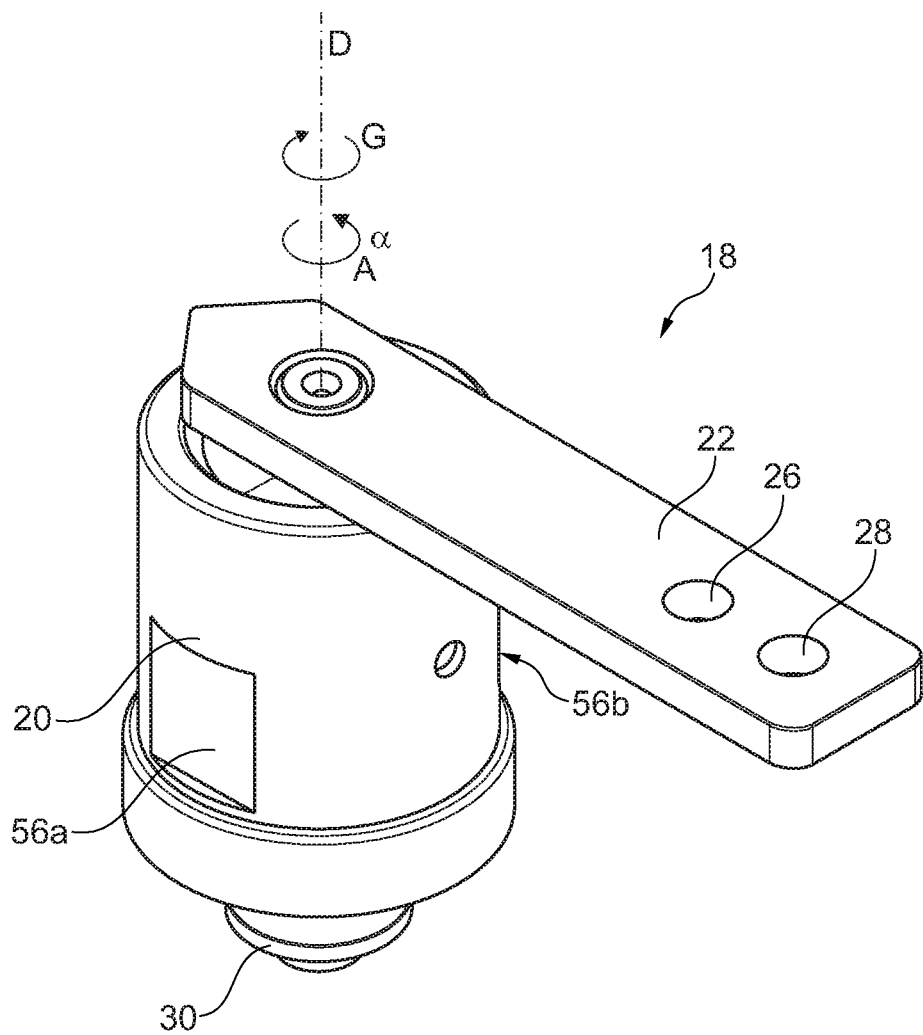

FIG. 2 depicts the transmission belt tensioner 18, its tensioning arm 22, a first hole 26, to which the tension pulley 24 (see FIG. 1) is fixed, and a second hole 28. The tensioning arm 22 is torsionally rigid about a rotational axis D about the housing 20. The transmission belt tensioner 18 can be positively fixed, e.g. by screwing it, using a foot 30.

Figure 3:
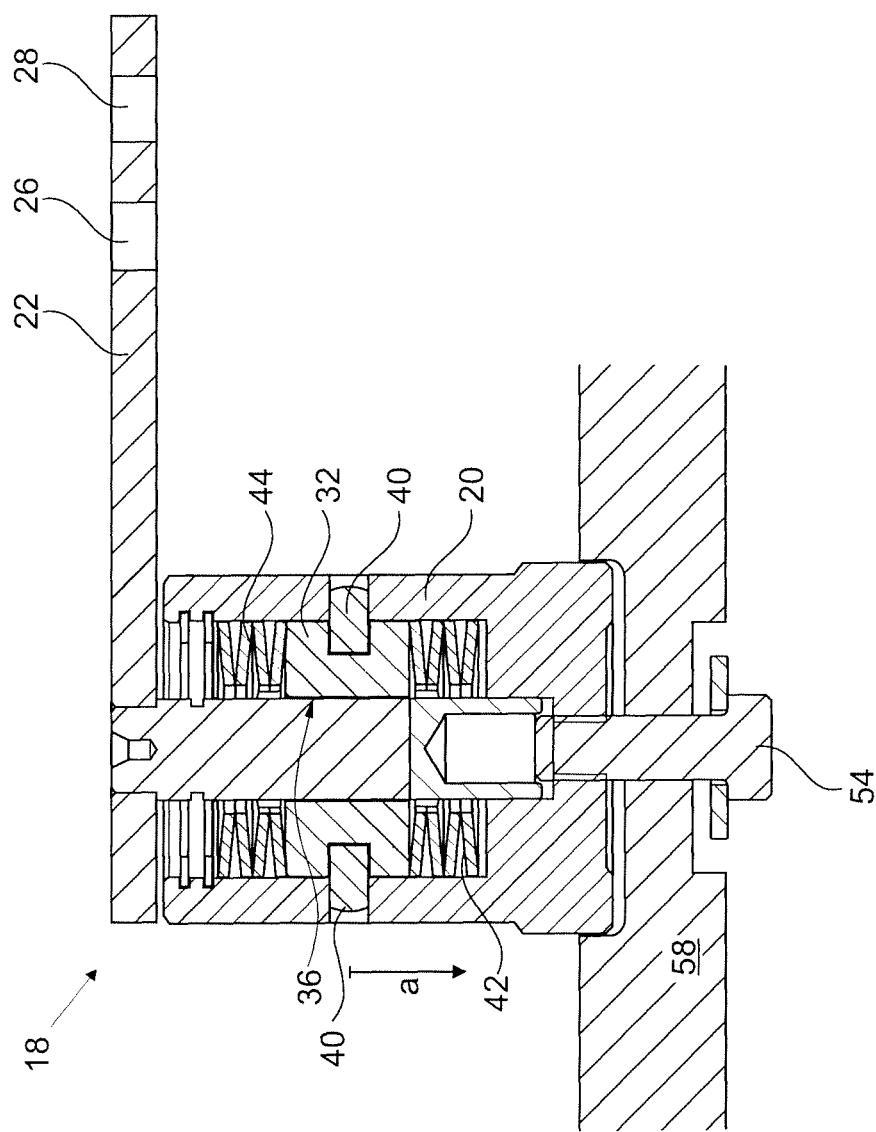

FIG. 3 depicts a cross-section through the transmission belt tensioner 18. It should be noted that the transmission belt tensioner 18 comprises a transposition element 32 which has a thread 34 on its outer surface (see FIG. 4). The transposition element 32 has inner toothing 36 which engages with outer toothing 38 (FIG. 4) of the tensioning arm 22. This results in the transposition element and the tensioning arm 22 being connected to one another such that they are torque-proof.

Figure 4:
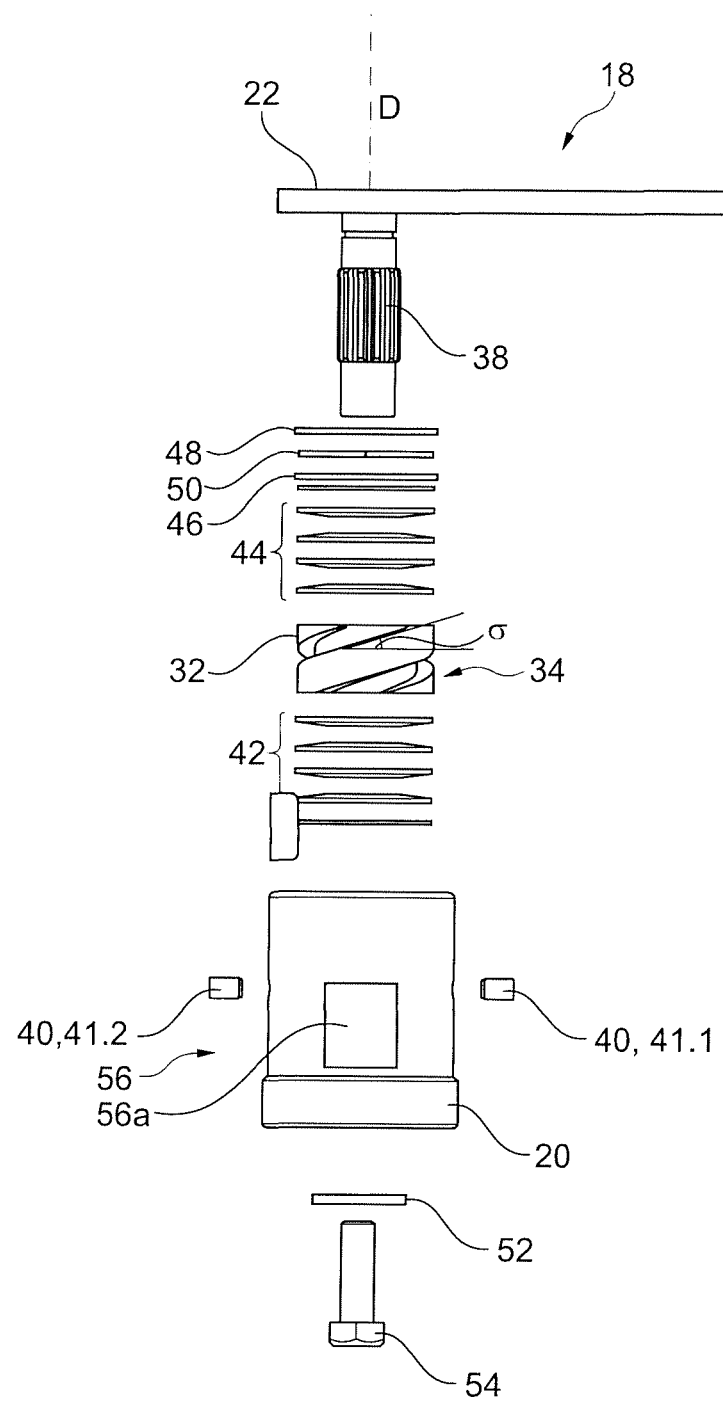

The housing 20 has a projection 40 that is designed as a section of an inner thread in the present case and engages with the thread 34 (see FIG. 4). A rotation of the tensioning arm 22 about a deflection angle α, which is counted positively in a deflection direction A (see FIG. 2), causes the transposition element 32 to move along a path a, which is downwards in the present case. The deflection angled is by definition zero if there is no torque acting between the housing 20 and the tensioning arm 22.

If the tensioning arm 22 moves in an opposite direction G, it only means that the deflection angle α becomes negative, causing the transposition element 32 to move along the path −a, i.e. upwards in the present case. It should be noted that the deflection angle is always measured as the angle covered by the tensioning arm 22 from the neutral position. This means that the deflection angle α cannot be defined as modulo 360°.

If the tensioning arm 22 moves in the deflection direction A, the deflection angle α is positive and if the transposition element 32 moves back over this path, a first set of disc springs 42 is compressed, which results in a restoring force that acts on the tensioning arm 22. However, if the tensioning arm 22 moves in the opposite direction, it means that the deflection angle α is negative, meaning that the transposition element 32 moves along the path −a, thereby compressing a second set of disc springs 44.

It should be noted that each set of disc springs may also comprise a single disc spring. However, it is beneficial if the first set 42 of disc springs has at least two, preferably three, four or more disc springs. It is also beneficial if the second set 44 of disc springs has at least two, preferably three, four or more disc springs. Furthermore, it is favourable is both sets 42, 44 have the same number of disc springs. However, it is possible that the number of disc springs in the first set differs from the number of disc springs in the second set. In this case, the restoring torque depends—in terms of value— not only on the size of the deflection angle α, but also on whether the deflection angle is positive or negative.

FIG. 4 depicts an exploded view of the transmission belt tensioner 18 according to the invention. It should be recognised that the projection 40 may also be formed of two pins 41.1, 41.2, which are designed to be e.g. situated opposite each other on the housing 20. It should be noted that the thread 34 has a pitch angle σ, which is constant in the present case. However, it is also possible that the pitch angle σ and therefore a pitch S=tan σ changes depending on the deflection angle α.

FIG. 4 shows that the transmission belt tensioner 18 also comprises a washer 46, a retaining ring 48, a mounting plate 50 and a seal 52, as well as a screw 54.

The tensioning arm 22 may be configured such that it moves axially relative to the transposition element 32. In other words, it is possible that the neutral position of the tensioning arm 22 is freely selected by inserting the tensioning arm, which is in the desired neutral position in the axial direction, into the transposition element 32.

The housing 20 comprises a coupling structure 56 for coupling with a tool (not depicted). In the present case, the coupling structure is covered by a first surface 56a and a surface 56b, which is arranged opposite and runs parallel to the first surface, both of which are designed in such a way that they can be connected using a metric open-end wrench such that they are rendered torque-proof, and can be operated as such.

To mount the transmission belt tensioner to a schematically depicted component 58, for example to a machine, the tension pulley 24 is first of all brought into contact with the transmission belt 16 and the housing 20 is loosely connected to the component 58. A wrench is then used to engage with the coupling structure 56 and the housing 20 is twisted relative to the tensioning arm 22 in such a way that a predefined tensile force F (see FIG. 1) is applied to the transmission belt. The degree to which the tensile force F depends on the deflection angle α is depicted in a table. The data set that correlates this dependency can be deemed part of the transmission belt tensioner.

If the correct tensile force F is selected, the screw 54 is tightened, thereby fixing the housing 20 relative to the component 58.

| Reference list | |
|---|---|
| 10 | belt drive |
| 12 | input drive belt wheel |
| 14 | output drive belt wheel |
| 16 | transmission belt |
| 18 | transmission belt tensioner |
| 20 | housing |
| 22 | tensioning arm |
| 24 | tension pulley |
| 26 | first hole |
| 28 | second hole |
| 30 | foot |
| 32 | transposition element |
| 34 | thread |
| 36 | inner toothing |
| 38 | outer toothing |
| 40 | projection |
| 42 | first set of disc springs |
| 44 | second set of disc springs |
| 46 | washer |
| 48 | retaining ring |
| 50 | mounting plate |
| 52 | seal |
| 54 | screw |
| 56 | coupling structure |
| 56a, b | surfaces |
| 58 | component |
| α | deflection angle |
| σ | pitch angle |
| A | deflection direction |
| D | rotational axis |
| F | tensile force |
| G | opposite direction |
| S | pitch |
| d | distance |

The invention claimed is:

1. Transmission belt tensioner, comprising:
   (a) a housing,
   (b) a first set of disc springs,
   (c) a tensioning arm which is connected to the first set of disc springs so as to cause compression of the first set of disc springs upon a movement of the tensioning arm out of a neutral position in a deflection direction relative to the housing,
   (d) a second set of disc springs,
   (e) wherein the tensioning arm is connected to the second set of disc springs so as to cause compression of the second set of disc springs upon a movement of the tensioning arm out of a neutral position in an opposite direction to the deflection direction.

2. Transmission belt tensioner according to claim 1, further comprising a tension pulley that is attached to the tensioning arm and configured to interact with a transmission belt.

3. Transmission belt tensioner according to claim 2, wherein
(a) the tension pulley is fixed to the tensioning arm in a first hole at a first distance from a rotational axis of the tensioning arm, and
(b) the tensioning arm has a second hole for fixing the tension pulley at a second distance that differs from the first distance.

4. Transmission belt tensioner according to claim 1, wherein the first set of disc springs and the second set of disc springs are configured to exert a restoring force if the tensioning arm is moved out of the neutral position.

5. Transmission belt tensioner, further comprising
(a) a housing,
(b) a first set of disc springs,
(c) a tensioning arm which is connected to the first set of disc springs so as to cause compression of the first set of disc springs upon a movement of the tensioning arm out of a neutral position in a deflection direction relative to the housing,
(d) a second set of disc springs,
(e) a transposition element that
is rigidly connected to the tensioning arm, and
comprises a thread,
wherein the tensioning arm is connected to the second set of disc springs so as to cause compression of the second set of disc springs upon a movement of the tensioning arm out of a neutral position in an opposite direction to the deflection direction,
wherein the housing has a projection that engages with the thread, and
wherein the projection and the transposition element are configured to effect the compression of the first set of disc springs or the second set of disc springs upon a movement of the tensioning arm out of the neutral position.

6. Transmission belt tensioner according to claim 5, wherein the thread has a constant pitch.

7. Transmission belt tensioner according to claim 5, wherein the thread has a pitch that changes from the neutral position upon a deflection of the tensioning arm.

8. A belt drive, comprising:
(a) an input drive belt wheel,
(b) an output drive belt wheel,
(c) a transmission belt which connects the input drive belt wheel and the output drive belt wheel, and
(d) a transmission belt tensioner according to claim 1, wherein the transmission belt is tensioned by the transmission belt tensioner.

\* \* \* \* \*